United States Patent Office 3,160,370
Patented Dec. 8, 1964

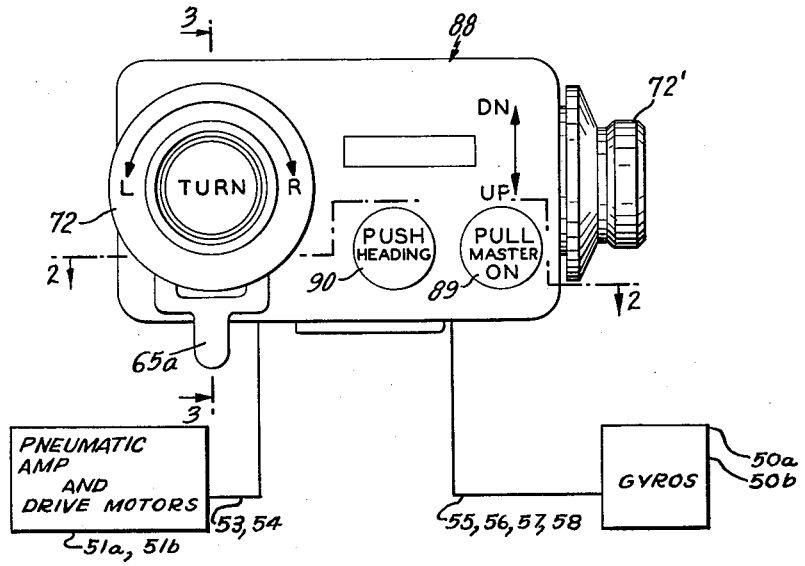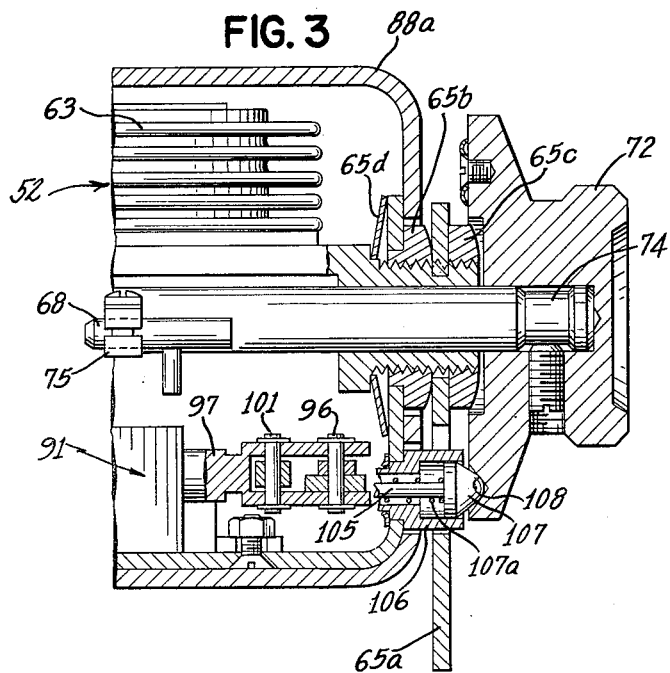

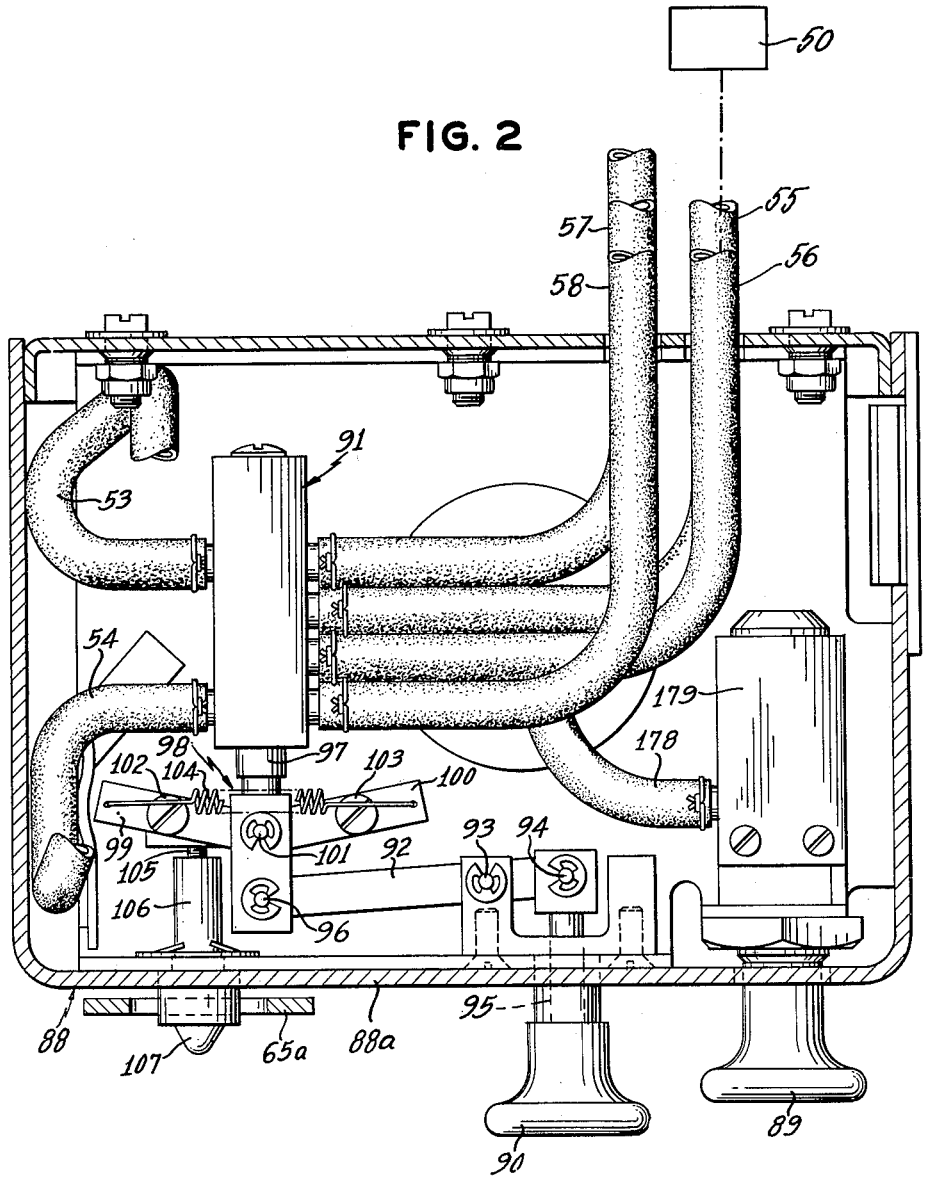

3,160,370
AUTOMATIC PILOT
Walter M. Templin, Wayne, Pa., assignor to Tactair Aircraft Products Co., Bridgeport, Pa., a corporation of Pennsylvania
Original application Apr. 14, 1958, Ser. No. 728,151, now Patent No. 3,044,490, dated July 17, 1962. Divided and this application Mar. 14, 1962, Ser. No. 179,696
2 Claims. (Cl. 244—78)

This invention relates to automatic pilots and more particularly to automatic pilots for dirigible craft based on pneumatic signal control and pneumatic power output. This application is a division of the pending United States application, Serial Number 728,151, filed April 14, 1958 now Patent No. 3,044,490.

As part of a complete automatic pilot system, it is necessary to provide various control functions which are accessible to the pilot. For example, it is necessary to provide manual control means whereby the pilot can override the sensing instruments and introduce his own command controls.

Accordingly, it is one object of the invention to provide improved pneumatic control means for use in automatic pilots.

Another object of the invention is to provide a command control unit for automatic pilots which automatically shuts off the signals from the directional gyroscope at such times as the pilot elects to control the aircraft through manually introduced error signals.

The above and other features of the present invention will be apparent to those skilled in the art by having reference to the following specification taken in conjunction with the accompanying drawings; in which:

FIGURE 1 is a view in front elevation of a typical control unit embodying the present invention;

FIGURE 2 is a view in transverse section taken on the line 2—2 of FIGURE 1 looking in the direction of the arrows; with the external turn control knob removed; and FIGURE 3 is a fragmentary view in vertical section taken on line 4—4 of FIGURE 2 looking in the direction of the arrows.

Referring first to FIGURE 1 the present invention is illustrated as embodied in a pneumatic automatic pilot system, a manual input control in the form of a command control unit 88 normally located in the aircraft at a point conveniently accessible to the pilot. The command control unit 88 has mounted therein a turn command control unit indicated generally by the numeral 52 partly shown and a substantially identical pitch command control unit (not shown). The command control unit also includes a master pneumatic or pilot valve control 89 for a power valve unit 179 and a heading set control 90, the latter being interconnected with the turn command control unit 52 partially shown in FIGURE 3.

The turn command control unit 52 is connected, via a cut-out valve 91, actuated by the heading set control 90, in shunt across a pair of pneumatic conduits 55 and 56 which carry pneumatic signals from a directional gyroscope 50 representative of deviations from desired headings. Conduits 53 and 54 lead to pneumatic amplifiers 51a which drive motors 51b connected to the control surfaces of the aircraft, all as described and illustrated in the said Patent No. 3,044,490. Pneumatic signals via conduits 57, 58 from the artificial horizon gyroscope are also shunted by the turn command control unit 52.

Command controls, as opposed to signals from the gyroscope units, are introduced into the turn command control unit 52 by means of a command knob 72. The knob 72 is held against rotation by a detent 107 which engages a shallow recess 108 in the knob 72. This detent mechanism holds the knob and lead screw releasably in a central or "no-signal" position.

Also included in the housing 88 is, as stated above, a master control knob 89 and a heading set knob 90 which controls a valve 91 through which the error signals of the directional gyroscope are coupled to the automatic pilot, this valve being interposed in the conduits 55 and 56 to cut the directional gyroscope in and out of the system. Depressing the knob 90 serves to open the valve 91 to cut the directional gyroscope into the system. However, when the pilot undertakes to maneuver the airplane through a command turn by means of the control knob 72, it is necessary that the directional gyroscope be cut out of the system so that there will be no error signal to adversely affect the turn. In accordance with the present invention, therefore, the directional gyroscope is automatically removed from the system when the knob 72 is manipulated.

To this end, as best seen at FIGURE 2, a coupling is provided between the knob 90 and the valve 91 including a rocker arm 92 pivoted to the casing 88a at 93 and having its right-hand end pivotally connected at 94 to a push shaft 95 (to which the knob 90 is affixed) and having its other end coupled in a pivotal connection 96 to a valve actuating shaft or stem 97. The valve stem 97 is held, releasably, in its full open or full closed positions by means of an overcentering toggle indicated generally by the numeral 98. The over-centering toggle includes a pair of articulated links 99 and 100, the common or center pin 101 of which is pinned to the valve shaft 97. The links 99 and 100 are pivoted to the frame at 102 and 103 respectively and a tension spring 104 reacts between extensions of their outer ends. As best seen at FIGURE 3, a push shaft 105 is slidably received in a bushing 106 carried by the casing, the shaft 105 terminating at its outer end in the detent 107 and at its inner end against the link 99 at a point spaced inwardly of its pivot 102. The detent 107 is urged outwardly by a spring 107a. The detent 107 is received in a recess 108 formed in the inner face of the knob 72, the recess being so disposed that the knob is in its neutral or no-command position when the detent is received therein.

In operation of the autopilot, assuming the knob 90 has been depressed and the aircraft is operating automatically under the control of the directional gyroscope and the artificial horizon, attention by the pilot is normally not required. In certain cases, however, it is essential or desirable that the pilot introduce his own command signals through the automatic pilot power system. In such case, the pilot turns the control knob 72 either to the right or to the left, depending on the direction of turn required, whereupon the knob drives the detent 107 inwardly to cause the push shaft 105 to drive the articulated links 99 and 100 of the toggle inwardly to overcenter the toggle and drive the valve stem 97 inwardly to close the valve 91 to cut off the conduits 55 and 56 carrying the error signals from the directional gyroscope. The aircraft is now under the control of the pilot and will perform such maneuvers as he might command. To re-engage the directional gyroscope, the pilot returns the knob 72 to its central or neutral position and depresses the knob 90 to open the valve 91 to re-engage the directional gyroscope at the same time the toggle is overcentered. If the aircraft is at this time not on the heading which has been preset in the directional gyroscope, the automatic pilot will promptly return it to that heading, even though the aircraft might be as much as 90° off course. The toggle cannot be overcentered unless the knob 72 is in its neutral or "no-command" position. Also, the toggle will hold the valve 91 either fully open or fully closed at all times.

The automatic cutout of the heading setting from the directional gyroscope enables the pilot to negotiate a turn through any desired angle without precessing the gyroscope or otherwise compensating for the error signal generated thereby.

While the invention has been described above having specific reference to the illustrated preferred embodiment thereof, it will be understood that various changes and modifications can be made in the system and the several component parts thereof.

The invention should not, therefore, be regarded as limited except as defined in the following claims:

I claim:

1. In an automatic pilot for dirigible craft, a pneumatic control system for steering the craft, a directional sensing instrument for affording pneumatic control signals representative of changing direction of the craft, pneumatic power means responsive to the control signals to direct the craft, manual control means including a first manual control member for introducing pneumatic control signals into said system to command a change of direction of the craft, valve means between the directional sensing instrument and the pneumatic control system, means to hold the valve means in either open or shut positions, a second manual control member connected to open the valve to introduce the control signals of the directional sensing instrument into the control system, and linkage means responsive to adjusting movement of said first manual control member to close the valve means.

2. Apparatus as set forth in claim 1, said linkage means for closing the valve means including a toggle and said first manual control member comprising a member rotatable by the pilot, detent means responsive to turning movement of the member in either direction from a neutral position to drive the toggle over center, said second manual control member being coupled to the toggle linkage to reverse the linkage to open the valve and means on said first control member to prevent reversing of the toggle linkage except when the first manual control member is in its neutral position.

References Cited by the Examiner

UNITED STATES PATENTS

| 2,370,076 | 2/45 | Rosenberger | 244—78 X |
| 2,390,119 | 12/45 | Nisbet et al. | 244—78 X |
| 2,561,873 | 7/51 | Kutzler | 244—77 |
| 2,678,177 | 5/54 | Chenery et al. | 244—75 |
| 2,890,844 | 6/59 | Cooper et al. | 244—77 |

MILTON BUCHLER, *Primary Examiner.*

ANDREW H. FARRELL, *Examiner.*